United States Patent [19]

Scheldorf

[11] 4,043,432

[45] Aug. 23, 1977

[54] COMPACT VIBRATION DAMPER FOR A HERMETIC REFRIGERANT COMPRESSOR

[75] Inventor: Owen H. Scheldorf, Louisville, Ky.

[73] Assignee: General Electric Company, Louisville, Ky.

[21] Appl. No.: 748,910

[22] Filed: Dec. 9, 1976

Related U.S. Application Data

[63] Continuation-in-part of Ser. No. 584,196, June 5, 1974, abandoned.

[51] Int. Cl.² .............................................. F16F 7/10
[52] U.S. Cl. ................................................... 188/1 B
[58] Field of Search ................. 138/26; 188/1 B, 1 C; 267/153

[56] References Cited

U.S. PATENT DOCUMENTS

| 2,857,974 | 10/1958 | Heller | 188/1 B X |
|---|---|---|---|
| 3,140,081 | 7/1964 | Peterson | 267/153 |
| 3,246,073 | 4/1966 | Bouche et al. | 188/1 B UX |
| 3,419,111 | 12/1968 | Jones et al. | 188/1 B |
| 3,478,160 | 11/1969 | Reed | 188/1 B X |
| 3,819,014 | 6/1974 | Mortensen | 188/1 B |

Primary Examiner—Duane A. Reger
Attorney, Agent, or Firm—Steven C. Schnedler; Francis H. Boos

[57] ABSTRACT

An offset center of gravity type vibration damper for dampening vibrations of the exhaust gas conduit of a refrigerant compressor. The damper comprises an annular body of elastomeric material sized for encircling a portion of the conduit intermediate the ends thereof, and a unitary element having clamping and mass portions. The clamping portion is generally cylindrical and clamps about the elastomeric body. The mass portion is longitudinally extended and semi-cylindrical.

1 Claim, 2 Drawing Figures

COMPACT VIBRATION DAMPER FOR A HERMETIC REFRIGERANT COMPRESSOR

CROSS REFERENCE TO RELATED APPLICATION

This is a continuation-in-part of application Ser. No. 584,196, filed June 5, 1975, now abandoned.

BACKGROUND OF THE INVENTION

1. Field of the Invention

The present invention relates generally to vibration dampers and, more particularly, to a compact vibration damper for the exhaust gas conduit of a hermetically sealed refrigerant compressor.

2. Description of the Prior Art

In the construction of hermetic refrigerant compressor units, an electric motor amd a positive displacement refrigerant compressor, both highly reliable, are sealed within a casing. Reliability of such a unit over an extended period of years is of utmost importance, and in most cases the compressor unit will operate trouble-free throughout the life of the refrigerator or air conditioner within which it is installed. The meticulous engineering design required to produce such a reliable unit has evolved over a period of years, resulting in the highly reliable units which are presently available. Consequently, any proposed changes to the design of such a compressor unit, even though seemingly inconsequential, must be very carefully considered and evaluated to minimize the possibility of increasing the probability of failure of the unit.

In addition to high reliability, another consideration in the design of hermetic referigerant compressor units is minimizing objectionable noise. A particular source of noise is the vibration of an exhaust gas condition, located within the hermetically sealed compressor casing, which conducts compressed refrigerant vapor from the outlet of the compressor itself out through the wall of the compressor casing. Typically, this compressor exhaust gas conduit does not extend in a straight line directly out through the compressor casing, but, rather, for reasons of mechanical arrangement, is relatively long and has a number of bends and curves to fit around various other components before emerging through the compressor casing wall. One such conduit for a particular compressor unit is 60 cm. in extended length, which length is more than twice the length of the compressor casing within which the conduit is installed.

It will be appreciated that due to the length of the conduit and the pulsating nature of the output of the positive displacement compressor, and additionally due to vibration induced by the rotation of the motor and compressor shaft, vibration of the conduit and resultant objectionable noise is produced.

Certain prior art compressor units have included vibration dampers for the exhaust gas conduit. Typically, such a damper comprises a cylindrical elastomer body positioned about the conduit and a generally cylindrical mass element clamped over the elastomer body substantially co-extensively therewith. However, such dampers were not highly effective and are not often used.

The present invention provides a highly efficient vibration damper especially adapted for dampening and minimizing the vibrations of the above-described exhaust gas conduit within the hermetically sealed refrigerant compressor unit. The vibration damper is compact so as to permit installation within compressor units without requiring other design changes to make more room, and is of a configuration which permits easy assembly. Further, the vibration damper is not expected to adversely affect the long-term reliability of the compressor unit.

SUMMARY OF THE INVENTION

The vibration damper of the present invention is generally of the offset center of gravity type for good effectiveness and is particularly adapted for installation to the exhaust gas conduit of a refrigerant compressor of the type described above. The damper comprises an annular body of elastomeric material which is sized for encircling a portion of the conduit intermediate the ends thereof. For convenience of installation, the annular body of elastomeric material may be split longitudinally so it may be elastically deformed to fit around the conduit without requiring access to the ends of the conduit. The vibration damper additionally comprises a unitary element having clamping and mass portions. The clamping portion is generally cylindrical, deformable, and has a longitudinal slot to facilitate clamping about the body of elastomeric material, again without requiring access to the ends of the conduit. The mass portion of the element is longitudinally extended to one side of the clamping portion and is semi-cylindrical with the center of curvature substantially coincident with the longitudinal axis of the conduit. As a result, the center of gravity of the element is both axially and radially offset from the point of attachment to the elastomeric body.

The damper according to the invention is highly effective in damping vibrations and is readily applied to the exhaust gas conduit. The compact construction of the damper enables it to be mounted within an existing compressor unit without requiring other design changes. The damper is not expected to adversely affect the reliability of the compressor unit because, due to its unitary construction and its being clamped to the conduit, it is unlikely to become dislodged.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENT

Figure 1:
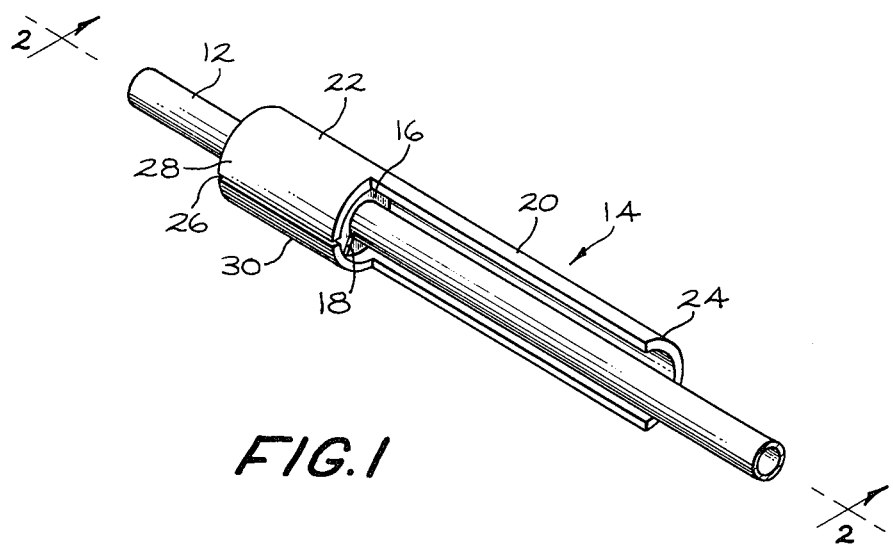
FIG. 1 is a perspective view of the vibration damper shown applied to a portion of the exhaust gas conduit of a refrigerant compressor.
Figure 2:
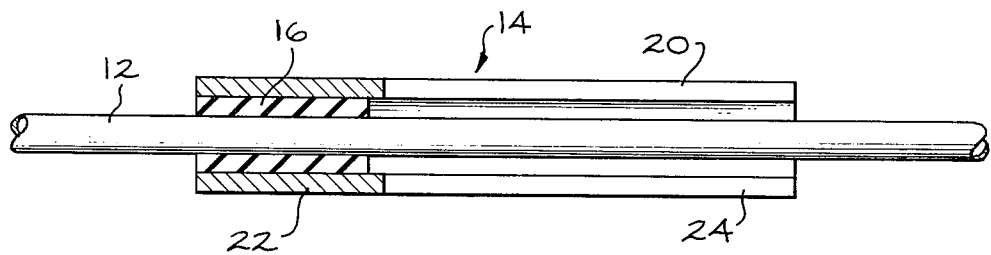
FIG. 2 is a longitudinal view taken along line 2—2 of FIG. 1.

Referring now to the drawings, a hermetically sealed refrigerant compressor unit includes an exhaust gas conduit 12 within the compressor unit casing. As mentioned hereinabove, the exhaust gas conduit 12 is subject to vibration which produces objectionable noise. To effectively minimize the noise, a vibration damper 14 according to the invention is attached to the conduit 12.

As shown, the vibration damper 14 is in two parts. The first part is an annular body 16 of elastomeric material which is sized for encircling a portion of the conduit 12 intermediate the ends thereof. Preferably, in order to permit convenient application of the elastomeric body 16 to the conduit 12, the body 16 may include a longitudinal slit 18, permitting the body 16 to conveniently be deformed and slipped over the conduit 12. Exemplary elastomeric materials useful for forming the annular body 16 are neoprene rubber and nitrile rubber.

The second portion of the vibration damper 14 is a unitary element 20 having a clamping portion 22 and a mass portion 24. The clamping portion 22 is generally cylindrical and sized for clamping about the outside of the elastomeric body 16. In order to permit convenient assembly without requiring access to the ends of the conduit, the clamping portion 22 is deformable and has a longitudinal slot 26 dividing the clamping portion 22 into a pair of clamping members 28 and 30. It will be appreciated that in the application of the clamping portion 22 to the conduit 12, either the clamping portion 22 may be formed in its ultimate, generally cylindrical configuration and then spread apart at the longitudinal slot 26 to permit application to the conduit and then again deformed to the original configuration for clamping, or the clamping portion 22 may be initially formed with the clamping members 28 and 30 substantially straight and then bent to form the cylinder which clamps about the annular body 16.

The mass portion 24 of the element 20 is longitudinally extended to one side of the clamping portion 22 and is semi-cylindrical in configuration in configuration with the cylindrical center of curvature substantially coincident with the longitudinal axis of the conduit 12. As a result, the center of gravity of the element 20 is both axially and radially offset from the point of attachment to the elastomeric body 16.

By so constructing the damper 14, vibrational forces in the conduit 12 are transmitted through the elastomeric body 16 to the element 20. Due to the offset center of gravity of the element 20, a torsional relative motion, generally perpendicular to the axis of the conduit 12, is generated between the conduit 12 and the element 20. This causes the elastomeric body 16 to be subjected to shear forces. For example, as the conduit 12 vibrates up and down, the element 20 is caused to pivot about the elastomeric body 16, with the mass portion 24 being moved up and down. Since the center of gravity of the element 20 is spaced from the elastomeric body 16, the reaction movement of the element 20 lags the movement of the conduit 12. Additionally, by having the center of gravity of the element 20 radially offset from the point of attachment of the elastomeric body 16, the number of vibrational modes which can be damped is increased, as is known in the art of vibration dampers.

The vibration damper 14 when applied as described has been found highly effective in the reduction of objectionable noise produced by a sealed hermetic refrigeration compressor. The damper 14 is effective over a broad range of vibrational frequencies. Although its effectiveness at particular frequencies can be altered by "tuning" the damper 14 by changing its dimensions and weight distribution, one of its advantages lies in its ability to damp vibrations over a relatively broad frequency band.

As already mentioned, another feature of the damper 14 is its compact configuration which permits it to be applied to an existing compressor unit design, without requiring other changes. To illustrate the relative size of the damper 14, an actually constructed embodiment was applied to the previously mentioned conduit having an overall extended length of 60 cm. and an outside diameter of 0.42 cm. The overall diameter of the damper 14, and particularly of the clamping portion 22 thereof, was 0.97 cm. This overall diameter of 0.97 cm. was small enough to fit within the existing confines of the compressor unit. The overall length of the damper 14 was 5.08 cm., again in the particular application small enough to fit within the available space.

The mid-point of the conduit 12 generally experiences the greatest movement during vibration. It is therefore recommended that the damper 14 be connected to about the middle third portion of the length of the conduit 12. More particularly, the damper 14 should be connected at the mid-point of the conduit. By so locating the damper 14, the vibration dampening efficiency is maintained at a high value.

It will be apparent therefore that the present invention provides an improved vibration damper for the exhaust conduit of a refrigeration compressor which provides effective damping over a range of vibrational frequencies, which may readily be installed to an existing compressor design without requiring a number of other design changes, and which is not expected to adversely affect the long-term trouble-free life of the compressor unit.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A compact, offset center of gravity type vibration damper for the exhaust conduit of a refrigerant compressor, which damper comprises:

an annular body of elastomeric material sized for encircling a portion of the conduit intermediate the ends thereof; and a unitary element having clamping and mass portions, said clamping portion being generally cylindrical, deformable, and having a longitudinal slot to permit clamping about said elastomeric body without requiring access to the ends of the conduit, and said mass portion being longitudinally extended and semi-cylindrical with the cylindrical center of curvature substantially coincident with the longitudinal axis of the conduit;

whereby the center of gravity of said element is axially and radially offset from the point of attachment to said elastomeric body, and said damper is readily applied to the conduit.

* * * * *